Figure 1:
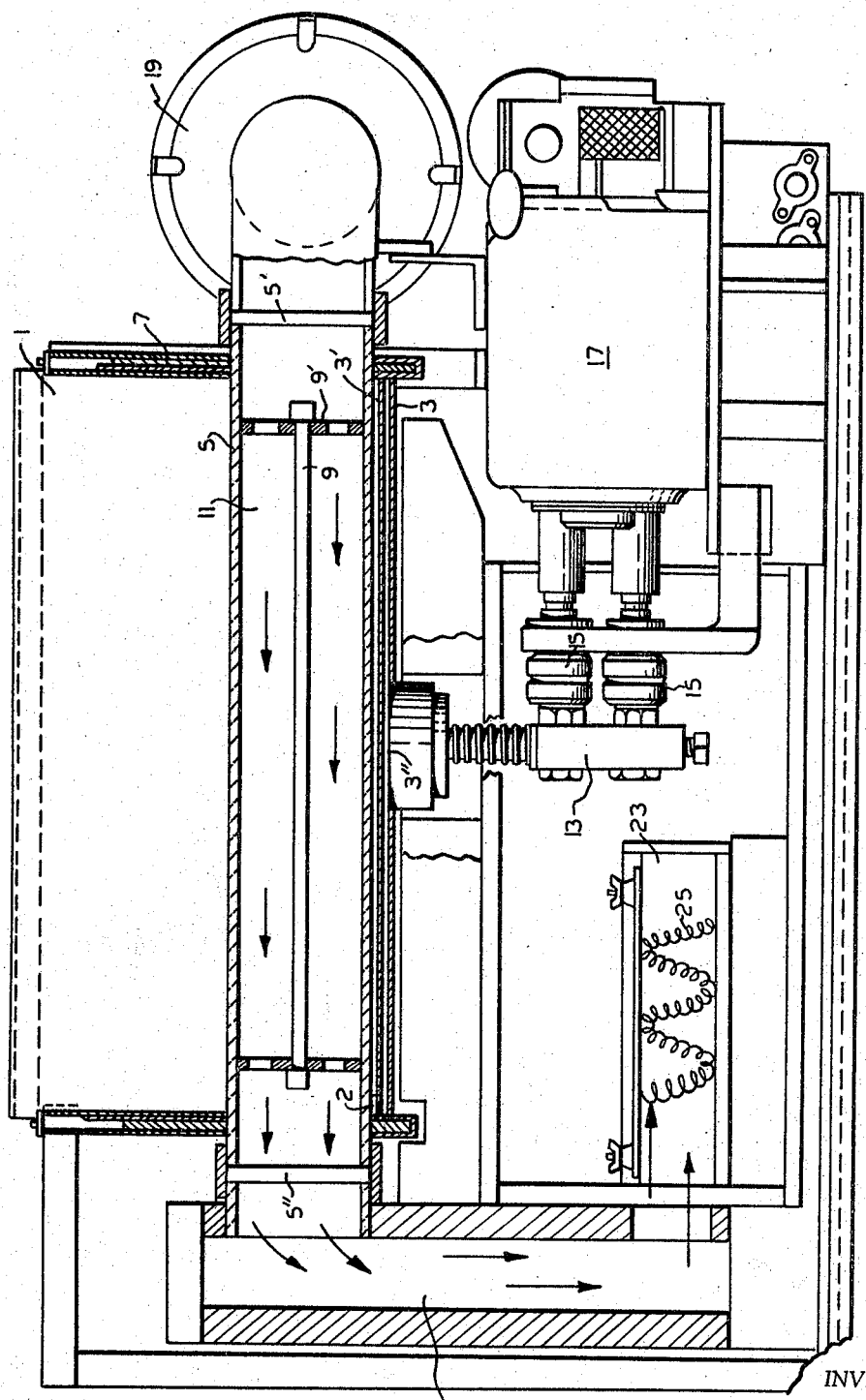

June 6, 1967  D. McINTYRE  3,323,510
METHOD OF AND APPARATUS FOR DISPENSING HOT-MELT MATERIALS
Original Filed Nov. 6, 1962  2 Sheets-Sheet 1

INVENTOR.
DONALD McINTYRE
BY
*Rines and Rines*
ATTORNEYS

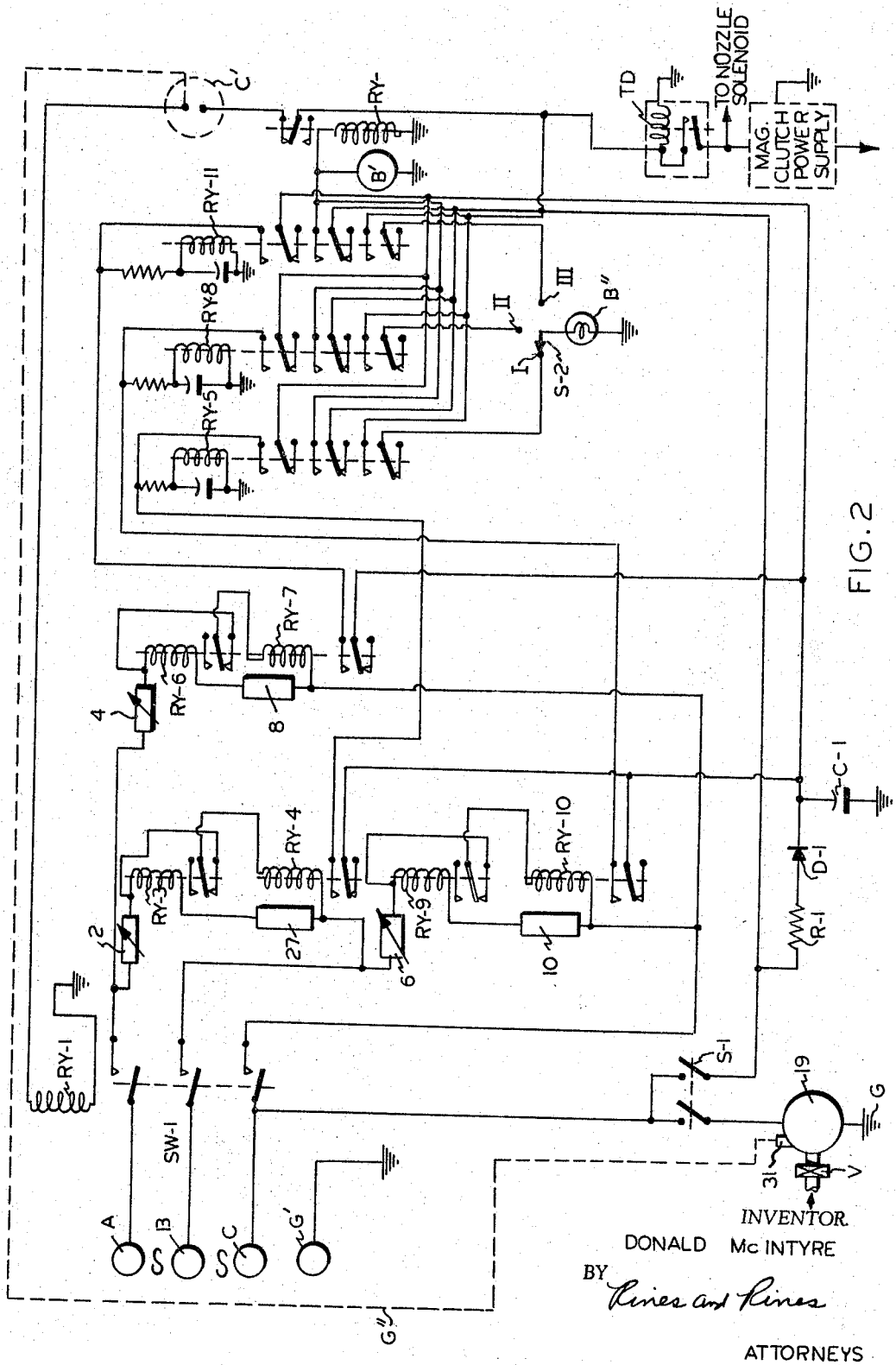

United States Patent Office 3,323,510
Patented June 6, 1967

3,323,510
METHOD OF AND APPARATUS FOR DISPENSING HOT-MELT MATERIALS
Donald McIntyre, 130 Old Colony Road, Weston, Mass. 02193
Continuation of application Ser. No. 235,720, Nov. 6, 1962. This application Nov. 17, 1965, Ser. No. 518,502
24 Claims. (Cl. 126—343.5)

This application is a continuation of Ser. No. 235,720, filed Nov. 6, 1962, for Apparatus for Dispensing Hot-Melt Materials.

The present invention relates to methods of and apparatus for dispensing hot-melt materials; and, more particularly, to the dispensing of adhesive-like materials which are to be converted from solid to molten form and continuously distributed along predetermined paths for such uses as adhesively coating papers and other materials.

Numerous types of hot-melt dispensing techniques and apparatus, all subject to serious limitations and disadvantages, later described, have been proposed and employed for high-speed gluing or adhering of various types of papers, boards, polyethylene and other plastic films or coated sheets, waxed papers and boards, sealing and seaming of bags, various types of multiple-leaf forms, such as business forms and the like, and a wide variety of other applications. One type of prior-art apparatus, for example, melts a preformed cord or stand of the hardened adhesive through contact with heating elements and applies the molten material by a wheel-type dispenser to the area where it is required, in a continuous process. Such apparatus is, however, not suited to the utilization of bulk materials, but requires the prefabrication of cord-like adhesives. In addition, the direct contact of the heating elements with the material-to-be-melted in this type of machine, as well as in other types of hot-melt adhesive applicators in which the material is placed into a large hopper, melted and pumped out in a continuous flow, inherently produces frequent scorching of the material during the heating process. This occurs because such direct-contact heating devices are incapable of automatically always limiting the amount of heat transferred by the direct contact of the heating elements to the adhesive material to be melted; so that, at times, the generated heat, even with thermostatic controls, will at least temporarily exceed the heat-absorption capacity of the material being melted. In addition, in prior-art devices of this character, the melted material frequently tends to harden in the pumping and distribution lines.

An object of the present invention, accordingly, is to provide a new and improved method of and apparatus for dispensing hot-melt material that shall not be subject to any of the above-described limitations or disadvantages; but that, to the contrary, are adapted for use with bulk materials and the like and enable a ready and automatic control of the transfer of heat to the material-to-be-melted, so that the amount of heat never substantially exceeds the heat-absorption capacity of the material, thus entirely eliminating scorching problems.

A further object is to provide a new and improved hot-melt dispensing apparatus of more general utility, also.

Other and further objects will be explained hereinafter and will be more particularly pointed out in connection with the appended claims. In summary, however, from one of its broad points of view, the invention relates to a method of dispensing hot-melt material that comprises storing the material-to-be-melted within a predetermined volume; radiating heat into the material from a region disposed within and surrounded by the material but out of direct contact with the material; controlling the transfer of heat radiated from the said region into the material so that the amount of radiated heat does not substantially exceed the heat-absorption capacity of the material being melted; withdrawing the melted material flowing around the said region; and distributing the withdrawn melted material along a predetermined path or paths. Preferred construction details are hereinafter set forth.

The invention will now be described in connection with the accompanying drawing, FIGURE 1 of which is a partial longitudinal section of apparatus constructed in accordance with a preferred embodiment of the invention; and FIGURE 2 is a schematic circuit diagram of a preferred circuit for operating the system of FIGURE 1.

Referring to FIGURE 1, a hopper 1 of substantially V-shaped cross-section contains, near its neck, base or bottom wall 3, having an outlet opening 3", a cylindrical heat-transparent container 5, as of high-temperature Pyrex glass or the like. The bulk material-to-be-melted (such as, for example, vinyl-base resins, adhesives, polyethylene and other plastic materials and the like) is inserted into the upper end or mouth of the hopper 1 and stored within the volume thereof.

Among the discoveries underlying the present invention, is the finding that, in order to avoid the scorching problems before-discussed, and to enable a reliable and automatic control of the amount of heat actually injected into the material, the heat should not be transferred to the material by direct conduction from a heat source, as in prior-art devices; but, rather, should be radiated into the material from the source without direct contact between the source and the material. To this end, container 5 is provided with an internal source of heat, shown as a conventional longitudinally extending far-infra-red quartz tube 9, mounted at 9' to extend axially along and within the cylindrical container 5. Heat generated by the quartz tube 9 will be radiated through the volume of the air medium 11 contained within the container 5 and through the Pyrex glass or other high-temperature radiation-permeable substantially non-conducting walls of the container 5, into the material disposed within the hopper 1. By virtue of the disposing or mounting of the container 5 in the described and illustrated position, the material within the hopper 1 will surround the container 5 so that heat will be transmitted in all directions into the material by this radiation process. Under such circumstances, the turning on and off of the source 9 as the amount of radiant heat transferred into the material 1 approaches the predetermined maximum heat absorption capacity of the particular molten material, provides an excellent degree of control that has been found completely to obviate the scorching and related problems previously discussed. This positioning of the container 5, moreover, near the neck of the V-shaped hopper 1, enables ejection of the molten material through the outlet 3" under the influence of gravity with assurance that no material is ejected or withdrawn that has not flowed around the heat-radiating container 5.

In view of the temperature variations involved in this process, the upwardly diverging side walls of the hopper 1 are preferably of resilient material, such as one thirty-second of an inch sheet aluminum, and the Pyrex-walled heat radiating container 5 is suspended between resilient high-temperature silicone sponge gaskets 7 or the like that form end wall sections of the hopper 1. The resilient character of the high-temperature gasket mountings 7 protects the container walls from the changing state of hot-melt liquid and maintains the heat source 9 floating within and thus independent of dimensional changes in the hopper 1 and the molten material therein.

If the neck 3 of the hopper 1 is rendered cylindrical, somewhat to match the bottom surface of the container 5, then the location of container 5 near to the hopper neck or bottom wall 3 is especially important. This is because it is then desirable to provide less cross-sectional area of the melt below the container 5 since the neck 3 of the hopper 1 will not have the resiliency of the side walls of the hopper and undue stresses or forces should be prevented from acting upon the container 5. In actual practice, for example, the lower surface of the container 5 may be of the order of a quarter of an inch above a substantially circular hopper base or neck 3.

A filter 3' may be inserted near and along the hopper base or neck 3, covering the outlet 3'' to remove any undesired particles that may remain in the melt. The filtered molten material passes through the outlet 3'' in the hopper base or neck 3 and is withdrawn down into a manifold 13 that, in turn, communicates with any conventional positive-displacement metering pumps 15, such as, for example, the "Acumeter" flow meter extruders currently marketed by Acumeter Laboratories, Inc. of Newton Lower Falls, Massachusetts. These pumps then enable the distribution of the molten material along desired distribution paths. The pumps may be provided with nozzles and multiple speed transmission devices, as is well known, schematically shown at 17, for the purpose of providing the desired distribution.

In order to insure that the withdrawn molten material that has entered the manifold 13 from the opening 3'' is maintained at the right temperature and degree of melt, supplemental heating may be required at the manifold and pump region 13–15, as well as at particular locations along the distribution lines. The right-hand and left-hand ends 5' and 5'' of the container 5 may be left opened, as shown, respectively to communicate with a pressure blower 19 and a duct 21 that will circulate hot air in the direction of the arrows, through an opening 23 that is directed upon the manifold 13 and pumps 15. In order to supplement this hot air circulation, additional electrical heating elements 25 may be disposed in the duct 21. As an illustration, with air passing through the duct system 21 at the rate of twenty cubic feet per minute, 2700-watt electric heaters 25 will enable the generation of a temperature of about 350° F. at the pump region 15.

The source of heat 9, as before stated, may be turned on and off in accordance with the temperature monitored by a thermo-element control 2 disposed where minimal cross section of the melt exists. Electrical controls associated with the control 2 and other features will hereinafter be discussed in connection with the embodiment of FIGURE 2, FIGURE 1 demonstrating only the mechanical configuration essential to the achievement of the novel results of the present invention. In the case of animal glues, the radiant temperature will be maintained at, say 180° F., more or less; while for low molecular plastics such as polyethylene and the like, the radiant temperature may be maintained at about 250° F. more or less; and still higher temperatures will be employed for other types of resins and adhesive-like substances.

Referring, now, to the controls that may be utilized with the system of FIGURE 1, the air blower 19 is shown grounded at one terminal G, FIGURE 2, and connected at its other terminal through a switch S–1, when closed, to the terminal C of, for example, a 3-phase, 110-volt alternating-current line, the other phase terminals of which are illustrated at A, B and the ground terminal G'. The amount of air circulation may be controlled or varied by the valve V. The thermoelement control 2 may be of the conventional variable-temperature liquid-filled bellows-operated micro-switch type ES8338 manufactured by United Electric Corporation of Watertown, Massachusetts. The control 2 is adjusted to the pre-scorching heat-absorption limit or capacity level of the material-to-be-melted. Similar adjustable temperature sensor and control switches are illustrated at 4 (to control the temperature in the pump chamber 15 of FIGURE 1) and at 6 (to control the temperature at the nozzle region 17 of FIGURE 1). The circuit connections to the heater element 9 that controls the temperature of the melt in the hopper, and the heater 25, etc. for the pump chamber, and the nozzle region of the pumps, are respectively shown at 27, 8 and 10.

When a relay RY–1 is energized, the three switches SW–1 shown therebelow and respectively connected to the terminals A, B and C, become moved to their upper positions. Each of relays RY–3, RY–9 and RY–6 becomes energized through respective series-connected hopper heat control 2 (between phase A–B and through element 27), nozzle heat control 6 (between phase B–C and through element 10), and pump heat control 4 (between phase A–C and through element 8). Depending upon the state of energization of the respective relays RY–3, RY–9, and RY–6, their armature-controlled switches, shown immediately therebelow, will cause respective relays RY–4, RY–10 and RY–7 to be connected across or disconnected from the respective series combinations of RY–3 and 27, RY–9 and 10, RY–6 and 8. With relays RY–4, RY–10 or RY–7 energized, upon a failure in the hopper heat control circuit, or the nozzle heat control circuit or the pump heat control circuit, above described, the switches shown immediately therebelow will, in turn, cause energization of respective relays RY–5, RY–8 and RY–11, causing the switches therebelow to effect operation of an alarm bell B'. The ringing of this bell B', moreover, is effective simultaneously with energization of relay RY–2, connected in parallel therewith, which will interrupt the circuit to relay RY–1 and thereby disconnect the system from the main terminals A, B, C and G'.

In order to ascertain where the failure occurred, however, switch S–2 may be moved to its three positions I, II and III, and the indicator bulb B'' connected in series therewith will light when the switch S–2 connects with the relay RY–5, RY–8 or RY–11 that has been energized by a failure in one or more of the hopper, nozzle or pump sections, of the apparatus. The voltage for operating the relays RY–5, RY–8, RY–11 and the failure indicators is obtained from the rectifying system R–1, D–1, which produces a direct-current voltage that is stored in shunt capacitor C–1.

For the purpose of insuring that the nozzle 17 be not rendered operative until the temperature of the complete system has reached a predetermined value at which a proper melt is produced, a conventional time-delay relay TD is provided which, unless it operates, will not permit energization of the nozzle control solenoid, so labelled, or a magnetic clutch, so-labelled, controlling the power supply system that would provide for the distribution of molten material through the pumping section 15, FIGURE 1, along the distribution path or paths.

A conventional interlock chain C' is also provided, with a vane 31 in the air blower 19 connected by gang connection G'' to open the circuit in the event that there is failure in the air circulation.

Monitoring of the air circulation, the proper operation of the quartz-tube heater and the operation of the pumping and distribution system is thus continuously effected with an indication provided in the event that any of the systems should fail or cease properly to operate.

It is to be understood that other well-known types of heat radiators or monitoring devices may also be used, as may additional sensing equipments including, for example, low-and-high-level indicators and shutoffs in the hopper 1. Further modifications will also occur to those skilled in the art and all such are considered to fall within the spirit and scope of the invention as defined in the appended claims.

What is claimed is:

1. Hot-melt-dispensing apparatus having, in combination, hopper means for storing the material-to-be-melted, a container provided with heat-radiation-permeable substantially non-conducting walls disposed within the hopper means at a position where the container is surrounded by the said material, a source of heat disposed within the container and spaced from the said walls thereof in order to radiate heat from the source through the container and its walls and into the said material within the hopper means, means for controlling the source to limit the amount of radiated heat transferred through the container walls to substantially the heat-absorption capacity of the material being melted, and an opening in the hopper means for withdrawing the melted material, the opening being located at a region reached by the melted material only after flowing around the container.

2. The apparatus of claim 1, further comprising means for circulating air through said container and means for directing the circulated air upon the withdrawn material.

3. The apparatus of claim 1, further comprising means for pumping the withdrawn material along a predetermined path, means for circulating air through said container, means for further heating the circulated air, and means for directing the heated circulated air upon a predetermined region of the pumping means.

4. Hot-melt-dispensing apparatus having, in combination, hopper means for storing the material-to-be-melted, a container provided with heat-radiation-permeable substantially non-conducting walls disposed within the hopper means at a position where the container is surrounded by the said material, a source of heat disposed within the container and out of direct contact with the said walls thereof in order to radiate heat from the source through the container and its walls and into the said material within the hopper means, means for circulating air through the container, means for controlling the source to limit the amount of radiated heat transferred through the container walls to substantially the heat-absorption capacity of the material being melted, an opening in the hopper means for withdrawing the melted material, the opening being located at a region reached by the melted material only after flowing around the container, means for pumping and distributing the withdrawn material along a predetermined path, means for further heating the said circulating air, and means for directing the heated circulated air upon a predetermined region of the pumping-and-distributing means.

5. Apparatus as claimed in claim 4 and in which the hopper means is provided with resilient side walls and the container is mounted in high-temperature-resisting resilient mountings.

6. Apparatus as claimed in claim 4 and in which the container is substantially cylindrical and the source comprises an axially disposed heating element.

7. Apparatus as claimed in claim 6 and in which the air-circulating means comprises blower means cooperating with an opening at one end of the cylindrical container and a duct extending from an opening at the other end of the container.

8. Apparatus as claimed in claim 7 and in which the duct is provided with heater means.

9. Apparatus as claimed in claim 6 and in which the walls of the container are of high-temperature glass and the heating element comprises a longitudinally extending quartz tube.

10. Apparatus as claimed in claim 6 and in which the side walls of the hopper means diverge upward from a bottom wall, and cylindrical-container resilient mountings close off the ends of the hopper means and dispose the container slightly displaced upward from the bottom wall thereof.

11. Apparatus as claimed in claim 10 and in which the said opening is disposed in the said bottom wall.

12. Apparatus as claimed in claim 10 and in which the said bottom wall is substantially cylindrically curved.

13. Apparatus as claimed in claim 4 and in which means is provided for monitoring at least one of the air-circulating means, the source-controlling means, the further heating means and the pumping-and-distributing means, and further means is provided responsive to the monitoring means for indicating failure of the monitored means.

14. Apparatus as claimed in claim 13 and in which all of the means set forth in claim 13 are provided with the said monitoring and indicating means.

15. Apparatus as claimed in claim 13 and in which the monitoring means comprise heat-sensitive switches and relays responsive to the switches.

16. Apparatus as claimed in claim 15 and in which the said indicating means comprise visual and/or audible indicators responsive to the said relays.

17. Apparatus as claimed in claim 4 and in which temperature-responsive means and a cooperative time delay device are provided for insuring proper operating temperatures before enabling actuation of the pumping-and-distributing means.

18. In a method of premelting a hot melt adhesive in which the hot melt adhesive is heated to form a liquified adhesive reservoir and portions of the liquified adhesive are furnished to a hot melt adhesive applicator the steps which include, supporting a mass of said hot melt adhesive with a hopper and around a heating duct supported in separated relationship to the bottom of the hopper to form a narrow passageway of crescent shaped cross section thereto, conducting a stream of hot gas in one direction through the heating duct to provide a flow of heat outwardly from said heating duct whereby portions of the mass of material located in the crescent shaped passageway are rapidly heated, confining a quantity of the premelted material in the elongated passageway of crescent shaped cross section to provide a thin laminar body of melted material, sensing changes in temperature in the melted material in the crescent shaped passageway and controlling the temperature of said hot gases in accordance with changes in temperature in said laminar body.

19. Method of heating a thermoplastic material to form a reservoir of a liquified adhesive body suitable for use with an adhesive applicator apparatus, said method including the steps of supporting a mass of said adhesive material within a hopper and around a heating duct supported in close proximity to the bottom of said hopper to form a passageway of crescent shaped cross section, conducting a current of hot gas through the heating duct to produce a flow of heat outwardly of the mass of material from the enclosed space to induce melting, confining a quantity of melted material in the crescent shaped restricted passageway to provide a thin laminar heat-sensitive body continuously sensing changes in temperature of the material in the crescent shaped passageway, varying the temperature of said hot gases in accordance with changes in temperature sensed in the laminar body at the bottom of the crescent shaped passageway, and periodically removing portions of the heated material from the bottom of the crescent shaped passageway for use in said applicator apparatus.

20. The method of claim 19, further including the step of circulating a current of heated gas externally of the hopper around the last-mentioned portions to provide a flow of heat inwardly thereof simultaneously with said outward flow of heat.

21. Apparatus for premelting a thermoplastic material of the hot melt adhesive type and supplying liquified adhesive to a hot melt adhesive applicator, said apparatus including a hopper having downwardly converging sides and a curved bottom, a tubular member mounted in the hopper and located in close proximity to the bottom of the hopper to define an elongated restricted passageway of crescent shaped cross section, an outlet member extending downwardly from the bottom of the hopper and communicating with the underside of said crescent shaped restricted passageway, means for circulating heat in said tubular member, and externally of the hopper member, a heat sensing element located in the bottom of said crescent shaped passageway and electromechanical means responsive to changes in temperature registered by said heat sensing element for controlling said heating means.

22. A structure as defined in claim 21, including a metering pump mechanism mounted below the hopper and constructed and arranged to remove melted material from said restricted passageway.

23. Apparatus for premelting a thermoplastic material of the hot melt adhesive type and supplying liquified adhesive to a hot melt adhesive applicator, said apparatus including a hopper having downwardly converging sides and a curved bottom, a tubular member mounted in the hopper and located in close proximity to the bottom of the hopper to define an elongated restricted passageway of crescent shaped cross section, an outlet member extending downwardly from the bottom of the hopper and communicating with the underside of said crescent shaped restricted passageway, means for circulating heat in said tubular member, and externally of the hopper, a heat sensing element located in the bottom of said crescent shaped passageway and means responsive to changes in temperature registered by said heat sensing element for controlling said heating means.

24. The apparatus of claim 23, wherein said circulating means circulates heat externally of the hopper upon said outlet member.

References Cited

UNITED STATES PATENTS

| | | | |
|---|---|---|---|
| 157,460 | 12/1874 | Perry | 222—146 |
| 2,185,594 | 1/1940 | Kittel | 126—343.5 X |
| 2,267,905 | 12/1941 | Frantz | 165—122 X |
| 2,322,041 | 6/1943 | Mayo | 165—122 X |
| 2,745,572 | 5/1956 | Talbott | 222—1 |
| 2,773,496 | 12/1956 | Czarnecki | 126—343.5 |
| 2,830,577 | 4/1958 | Walter | 126—343.5 |
| 2,839,332 | 6/1958 | Sackett | 126—343.5 X |
| 2,954,826 | 10/1960 | Sievers. | |
| 3,018,922 | 1/1962 | Williamson | 222—25 |
| 3,059,086 | 10/1962 | Pedersen | 219—343 |
| 3,089,939 | 5/1963 | Dunlap et al. | 219—44.1 X |
| 3,091,233 | 5/1963 | Dunlap | 222—146 X |

FOREIGN PATENTS 563,945   9/1944   Great Britain.

OTHER REFERENCES

Allgaer et al., German application No. 1,012,154, Pub. 7-11-57, K1 53e-1. (1 sht. dwg., 2 pp. spec.).

CHARLES J. MYHRE, *Primary Examiner.*